United States Patent
Okazaki et al.

(10) Patent No.: US 12,491,935 B2
(45) Date of Patent: Dec. 9, 2025

(54) DRIVING ASSISTANCE DEVICE, DRIVING ASSISTANCE METHOD, AND STORAGE MEDIUM

(71) Applicant: HONDA MOTOR CO., LTD., Tokyo (JP)

(72) Inventors: Yuta Okazaki, Tokyo (JP); Saki Shindo, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 196 days.

(21) Appl. No.: 18/206,108

(22) Filed: Jun. 6, 2023

(65) Prior Publication Data
US 2023/0415811 A1 Dec. 28, 2023

(30) Foreign Application Priority Data
Jun. 23, 2022 (JP) .................... 2022-100931

(51) Int. Cl.
*B62D 6/00* (2006.01)
(52) U.S. Cl.
CPC ............ *B62D 6/001* (2013.01); *B62D 6/007* (2013.01)
(58) Field of Classification Search
CPC ........ B62D 1/28; B62D 6/008; B62D 15/025; B60W 30/12; B60W 30/18; B60W 30/18145
See application file for complete search history.

(56) References Cited

U.S. PATENT DOCUMENTS

| 2014/0222296 A1* | 8/2014 | Takeuchi | F16H 59/00 701/48 |
| 2017/0158227 A1* | 6/2017 | Katzourakis | B62D 6/008 |
| 2018/0326990 A1* | 11/2018 | Kusaka | B60W 10/18 |
| 2019/0286127 A1* | 9/2019 | Watanabe | G05D 1/0061 |
| 2019/0367025 A1* | 12/2019 | Pathak | B60W 40/04 |
| 2020/0255007 A1* | 8/2020 | Tsuji | B60W 50/16 |

FOREIGN PATENT DOCUMENTS

| JP | 2008-168684 | 7/2008 |
| JP | 2012-144070 | 8/2012 |
| JP | 2012-232704 | 11/2012 |
| JP | 2017-220070 | 12/2017 |
| JP | 2018-203180 | 12/2018 |

OTHER PUBLICATIONS

Japanese Office Action for Japanese Patent Application No. 2022-100931 mailed Oct. 31, 2023.

* cited by examiner

Primary Examiner — Khoi H Tran
Assistant Examiner — Tristan J Greiner
(74) Attorney, Agent, or Firm — Amin, Turocy & Watson, LLP (57) ABSTRACT

According to an embodiment, a driving assistance device includes a recognizer configured to recognize a surrounding situation of a vehicle and a steering controller configured to control at least steering of the vehicle so that the vehicle travels in a travel lane when the vehicle tends to deviate from the travel lane on the basis of a recognition result of the recognizer. The steering controller controls the steering of the vehicle by selecting any steering characteristic in accordance with information obtained from an occupant of the vehicle among a plurality of steering characteristics.

8 Claims, 4 Drawing Sheets

DRIVING ASSISTANCE DEVICE, DRIVING ASSISTANCE METHOD, AND STORAGE MEDIUM

CROSS-REFERENCE TO RELATED APPLICATION

Priority is claimed on Japanese Patent Application No. 2022-100931, filed Jun. 23, 2022, the content of which is incorporated herein by reference.

BACKGROUND

Field of the Invention

The present invention relates to a driving assistance device, a driving assistance method, and a storage medium.

Description of Related Art

In recent years, efforts to provide access to sustainable transport systems that take into account vulnerable groups among traffic participants have become active. To implement these, research and development for further improving traffic safety and convenience through research and development related to driving assistance technology are being focused on. In relation to this, in the related art, technology for applying reaction force torque to a steering mechanism so that a vehicle does not deviate from a target travel line in a lane keeping assistance system (LKAS) is disclosed (for example, Japanese Unexamined Patent Application, First Publication No. 2012-232704).

SUMMARY

Meanwhile, a process of controlling reaction force torque in accordance with an occupant's preference has not been taken into account in the conventional driving assistance technology. Thus, there is a problem that it may be difficult to provide appropriate assistance to an occupant during the execution of lane keeping assistance.

To solve the above-described problem, an objective of this application is to provide a driving assistance device, a driving assistance method, and a storage medium capable of providing appropriate lane keeping assistance for an occupant. Also, it is possible to contribute to the development of a sustainable transportation system.

A driving assistance device, a driving assistance method, and a storage medium according to the present invention adopt the following configurations.

(1): According to an aspect of the present invention, there is provided a driving assistance device including: a recognizer configured to recognize a surrounding situation of a vehicle; and a steering controller configured to control at least steering of the vehicle so that the vehicle travels in a travel lane when the vehicle tends to deviate from the travel lane on the basis of a recognition result of the recognizer, wherein the steering controller controls the steering of the vehicle by selecting any steering characteristic in accordance with information obtained from an occupant of the vehicle among a plurality of steering characteristics.

(2): In the above-described aspect (1), the plurality of steering characteristics include at least a first steering characteristic and a second steering characteristic having a larger steering reaction force of the vehicle than the first steering characteristic.

(3): In the above-described aspect (2), the second steering characteristic has a larger steering reaction force corresponding to a distance from a center of the travel lane of the vehicle than the first steering characteristic.

(4): In the above-described aspect (1), the steering controller controls the steering of the vehicle by switching the steering characteristic to the steering characteristic selected by the occupant among the plurality of steering characteristics.

(5): In the above-described aspect (1), the driving assistance device further includes a driving characteristic acquirer configured to acquire driving characteristics of the vehicle from the occupant of the vehicle, wherein the steering controller controls the steering of the vehicle by selecting any steering characteristic among the plurality of steering characteristics on the basis of the driving characteristics acquired by the driving characteristic acquirer.

(6): In the above-described aspect (2), the plurality of steering characteristics further include a third steering characteristic for controlling the steering of the vehicle according to a steering reaction force between the steering reaction force based on the first steering characteristic and the steering reaction force based on the second steering characteristics, and the steering controller temporarily controls the steering of the vehicle according to the third steering characteristic when the steering characteristic is switched between the first steering characteristic and the second steering characteristic.

(7): In the above-described aspect (1), the driving assistance device further includes an occupant state acquirer configured to acquire a state of the occupant of the vehicle, wherein the steering controller controls the steering of the vehicle by selecting any steering characteristic among the plurality of steering characteristics on the basis of the occupant state acquired by the occupant state acquirer.

(8): In the above-described aspect (1), the steering controller controls the steering of the vehicle by selecting any steering characteristic among the plurality of steering characteristics on the basis of information obtained from the occupant of the vehicle and a road situation near the vehicle recognized by the recognizer.

(9): According to another aspect of the present invention, there is provided a driving assistance method including: recognizing, by a computer, a surrounding situation of a vehicle; controlling, by the computer, at least steering of the vehicle so that the vehicle travels in a travel lane when the vehicle tends to deviate from the travel lane on the basis of a recognition result; and controlling, by the computer, the steering of the vehicle by selecting any steering characteristic in accordance with information obtained from an occupant of the vehicle among a plurality of steering characteristics.

(10): According to yet another aspect of the present invention, there is provided a computer-readable non-transitory storage medium storing a program for causing a computer to: recognize a surrounding situation of a vehicle; control at least steering of the vehicle so that the vehicle travels in a travel lane when the vehicle tends to deviate from the travel lane on the basis of a recognition result; and control the steering of the vehicle by selecting any steering characteristic in accordance with information obtained from an occupant of the vehicle among a plurality of steering characteristics.

According to the above-described aspects (1) to (10), it is possible to provide appropriate lane keeping assistance for an occupant.

DESCRIPTION OF EMBODIMENTS

Hereinafter, embodiments of a driving assistance device, a driving assistance method, and a storage medium of the present invention will be described with reference to the drawings.

[Overall Configuration]

Figure 1:
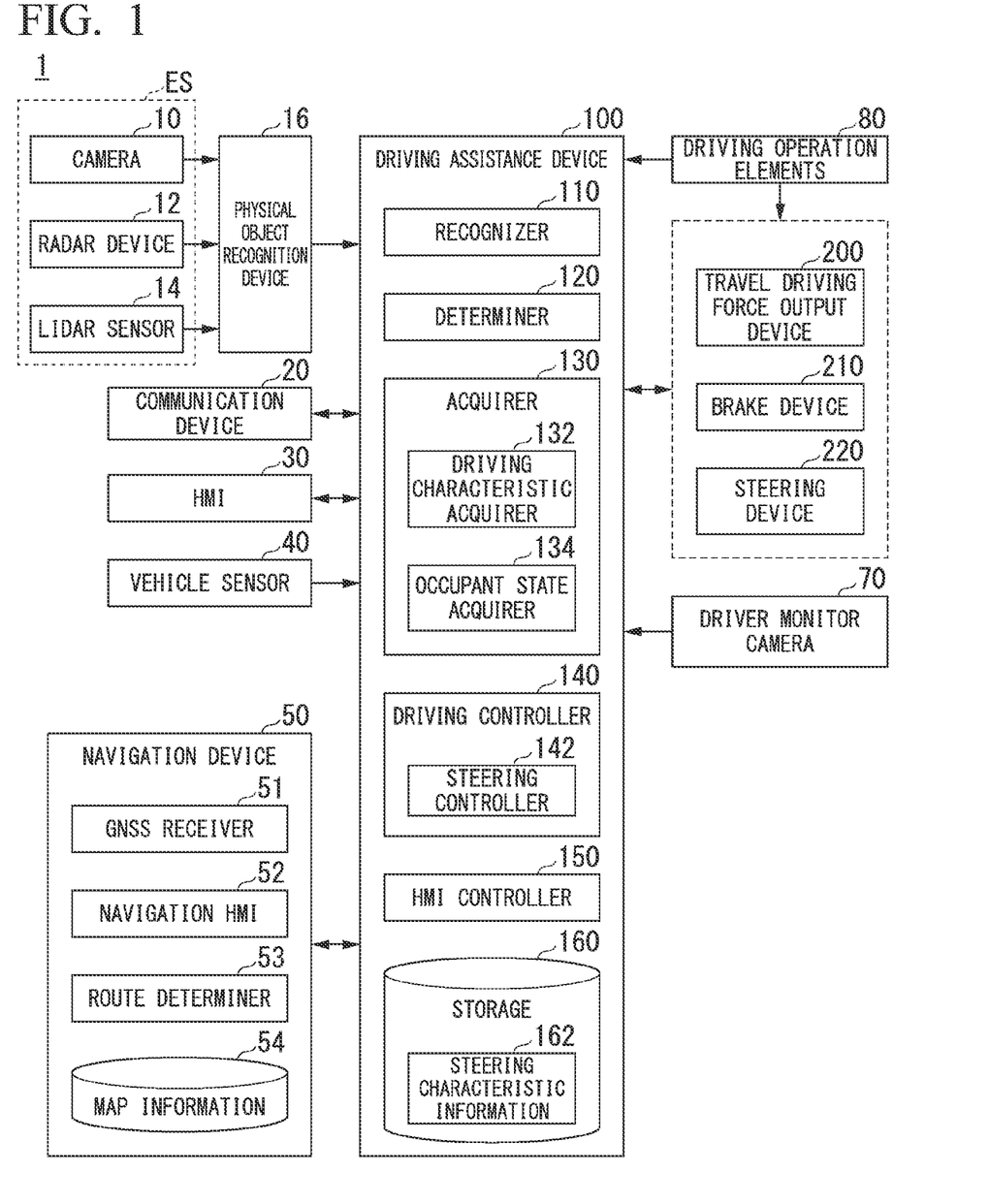
FIG. 1 is a configuration diagram of a vehicle system to which a driving assistance device according to an embodiment is applied.

FIG. 1 is a configuration diagram of a vehicle system 1 to which a driving assistance device according to the present embodiment is applied. A vehicle (hereinafter referred to as a vehicle M) in which the vehicle system 1 is mounted is, for example, a vehicle such as a two-wheeled vehicle, a three-wheeled vehicle, or a four-wheeled vehicle, and a drive source thereof is an internal combustion engine such as a diesel engine or a gasoline engine, an electric motor, or a combination thereof. The electric motor operates using electric power generated by a power generator connected to the internal combustion engine or electric power that is supplied when a secondary battery or a fuel cell is discharged. In the following description, it is assumed that the vehicle M is a four-wheeled vehicle. Hereinafter, as an example, the driving assistance device may be applied to an automated driving vehicle. In automated driving, for example, driving control is executed by automatically controlling one or both of steering and acceleration/deceleration of the vehicle M. The driving control of the vehicle M may include, for example, various types of driving assistance such as adaptive cruise control (ACC), an LKAS, lane change assist (LCA), a forward collision warning (FCW), and a collision mitigation braking system (CMBS). In the automated driving vehicle, partial or total driving may be controlled according to manual driving of an occupant (a driver).

For example, the vehicle system 1 includes a camera (an example of an imager) 10, a radar device 12, a light detection and ranging (LIDAR) sensor 14, a physical object recognition device 16, a communication device 20, a human machine interface (HMI) 30, a vehicle sensor 40, a navigation device 50, a driver monitor camera (an example of a cabin imager) 70, driving operation elements 80, an driving assistance device 100, a travel driving force output device 200, a brake device 210, and a steering device 220. Such devices and equipment are connected to each other by a multiplex communication line such as a controller area network (CAN) communication line, a serial communication line, or a wireless communication network. The configuration shown in FIG. 1 is merely an example and some of the components may be omitted or other components may be further added. A combination of the camera 10, the radar device 12, and the LIDAR sensor 14 is an example of an "external sensor ES." The external sensor ES may include the physical object recognition device 16 or may include other detectors (for example, sound navigation and ranging (SONAR)) that recognize the surrounding situation of the vehicle M. The external sensor ES may have a configuration of only the camera 10 or a simple configuration of only the camera 10 and the radar device 12. The HMI 30 is an example of a "receiver" and an "output."

For example, the camera 10 is a digital camera using a solid-state imaging element such as a charge-coupled device (CCD) or a complementary metal-oxide semiconductor (CMOS). The camera 10 is attached to any location on the vehicle M. For example, when the view in front of the vehicle M is imaged, the camera 10 is attached to an upper part of a front windshield, a rear surface of a rearview mirror, or the like. When the view to the rear of the vehicle M is imaged, the camera 10 is attached to an upper part of a rear windshield, a back door, or the like. When the views to the side and the rear side of the vehicle M are imaged, the camera 10 is attached to a door mirror or the like. For example, the camera 10 periodically and iteratively images the surroundings of the vehicle M. The camera 10 may be a stereo camera.

The radar device 12 radiates radio waves such as millimeter waves around the vehicle M and detects at least a position (a distance to and a direction) of a physical object by detecting radio waves (reflected waves) reflected by the physical object. The radar device 12 is attached to any location on the vehicle M. The radar device 12 may detect a position and a speed of the physical object in a frequency modulated continuous wave (FM-CW) scheme.

The LIDAR sensor 14 radiates light (or electromagnetic waves having a wavelength close to light) to the vicinity of the vehicle M and measures scattered light. The LIDAR sensor 14 detects a distance from an object on the basis of time from light emission to light reception. The radiated light is, for example, pulsed laser light. The LIDAR sensor 14 is attached to any location on the vehicle M.

The physical object recognition device 16 performs a sensor fusion process on detection results from some or all of the components included in the external sensor ES to recognize a position, a type, a speed, and the like of a physical object near the vehicle M. The physical object recognition device 16 outputs recognition results to the driving assistance device 100. The physical object recognition device 16 may output detection results of the external sensor ES to the driving assistance device 100 as they are. The physical object recognition device 16 may be omitted from the vehicle system 1.

The communication device 20 communicates with another vehicle located in the vicinity of the vehicle M using, for example, a cellular network or a Wi-Fi network, Bluetooth (registered trademark), dedicated short range communication (DSRC), or the like, or communicates with various types of server devices via a radio base station.

The HMI 30 presents various types of information to an occupant of the vehicle M and receives an input operation from the occupant under control of the HIM controller 150. The HMI 30 includes, for example, a display device, a speaker, a microphone, a buzzer, a touch panel, keys, and the like. The HMI 30 includes, for example, a switch (a driving assistance changeover switch) for accepting whether or not to execute various types of driving assistance such as an LKAS and ACC and a switch for switching and adjusting a steering characteristic during the execution of the LKAS. The steering characteristics include, for example, a characteristic related to a weight of the steering wheel operated by the occupant or a characteristic related to a magnitude of a reaction force of the steering wheel generated to return into the travel lane when the vehicle M tends to deviate from the travel lane in control based on the LKAS (hereinafter referred to as "LKAS control"). Details of the steering characteristics in the embodiment will be described below.

The vehicle sensor 40 includes a vehicle speed sensor configured to detect the speed of the vehicle M, an acceleration sensor configured to detect acceleration, a yaw rate sensor configured to detect an angular speed around a vertical axis, a direction sensor configured to detect a direction of the vehicle M, and the like. The vehicle sensor 40 may include a steering angle sensor configured to detect a steering angle of the vehicle M (which may be an angle of the steering wheel or an operating angle of the steering wheel). The vehicle sensor 40 may include a position sensor configured to acquire the position of the vehicle M. The position sensor is, for example, a sensor configured to acquire position information (longitude/latitude information) from a Global Positioning System (GPS) device. The position sensor may be a sensor configured to acquire position information using a global navigation satellite system (GNSS) receiver 51 of the navigation device 50.

For example, the navigation device 50 includes a global navigation satellite system (GNSS) receiver 51, a navigation HMI 52, and a route decider 53. The navigation device 50 holds map information 54 in a storage device such as a hard disk drive (HDD) or a flash memory. The GNSS receiver 51 identifies a position of the vehicle M on the basis of a signal received from a GNSS satellite. The position of the vehicle M may be identified or corrected by an inertial navigation system (INS) using an output of the vehicle sensor 40. The navigation HMI 52 includes a display device, a speaker, a touch panel, keys, and the like. The navigation HMI 52 may be partly or wholly shared with the above-described HMI 30. For example, the route decider 53 decides on a route (hereinafter referred to as a route on a map) from the position of the vehicle M identified by the GNSS receiver 51 (or any input position) to a destination input by the occupant using the navigation HMI 52 with reference to the map information 54. The map information 54 is, for example, information in which a road shape is expressed by a link indicating a road and nodes connected by the link. The map information 54 may include the curvature of a road, point of interest (POI) information, and the like. The map information 54 may include, for example, lane center information, lane boundary information (road markings), a lane width, and the like or may include road information (for example, expressways and general roads), traffic regulation information (for example, a speed limit), address information (an address/postal code), facility information, telephone number information, and the like. The map information 54 may be updated at any time by the communication device 20 communicating with other devices. The map information 54 may be stored in the storage of the driving assistance device 100 to be described below.

The navigation device 50 may provide route guidance using the navigation HMI 52 on the basis of the route on the map. The navigation device 50 may be implemented, for example, according to a function of a terminal device such as a smartphone or a tablet terminal possessed by the occupant. The navigation device 50 may transmit a current position and a destination to a navigation server via the communication device 20 and acquire a route equivalent to the route on the map from the navigation server.

The driver monitor camera 70 is, for example, a digital camera that uses a solid-state image sensor such as a CCD or a CMOS. The driver monitor camera 70 is attached to any location on the vehicle M with respect to a position and a direction where the head of the occupant (hereinafter, the driver) sitting in the driver's seat of the vehicle M can be imaged from the front (in a direction in which his/her face is imaged). For example, the driver monitor camera 70 is attached to an upper part of a display device provided on the central portion of the instrument panel of the vehicle M. The driver monitor camera 70 acquires images obtained by imaging the cabin including the occupant of the vehicle M from an arrangement position thereof at prescribed intervals. The driver monitor camera 70 may acquire images including a fellow passenger at prescribed intervals. The driver monitor camera 70 may acquire a sound within the cabin (for example, a conversation of an occupant) or the like in addition to the images. Information acquired by the driver monitor camera 70 is output to the driving assistance device 100.

For example, the driving operation elements 80 include an accelerator pedal, a brake pedal, a shift lever, and other operation elements in addition to a steering wheel. A sensor configured to detect an amount of operation or the presence or absence of an operation is attached to the driving operation element 80 and a detection result of the sensor is output to the driving assistance device 100 or some or all of the travel driving force output device 200, the brake device 210, and the steering device 220. The steering wheel is an example of an "operation element that receives a steering operation by the driver." The operation element does not necessarily have to be annular, and may be in the form of a variant steering, a joystick, a button, or the like. The driving operation element 80 outputs a steering angle and an amount of steering torque when the occupant (driver) of the vehicle M steers the steering wheel in a prescribed direction to the driving assistance device 100.

The driving assistance device 100 includes, for example, a recognizer 110, a determiner 120, an acquirer 130, a driving controller 140, an HMI controller 150, and a storage 160. The recognizer 110, the determiner 120, the acquirer 130, the driving controller 140, and the HMI controller 150 are implemented, for example, by a hardware processor such as a CPU executing a program (software). Some or all of these components may be implemented by hardware (including a circuit; circuitry) such as a large-scale integration (LSI) circuit, an application-specific integrated circuit (ASIC), a field-programmable gate array (FPGA), or a graphics processing unit (GPU) or may be implemented by software and hardware in cooperation. The program may be prestored in a storage device (a storage device including a non-transitory storage medium) such as a hard disk drive (HDD) or a flash memory of the driving assistance device 100 or may be stored in a removable storage medium such as a digital video disc (DVD) or a compact disc-read-only memory (CD-ROM) and installed in the HDD or the flash memory of the driving assistance device 100 when the storage medium (a non-transitory storage medium) is mounted in a drive device. The HMI controller 150 is an example of an "output controller."

The storage 160 may be implemented by the above-described various storage devices, a solid-state drive (SSD), an electrically erasable programmable read only memory (EEPROM), a read-only memory (ROM), a random-access memory (RAM), or the like. The storage 160 stores, for example, steering characteristic information 162, programs, various other types of information, and the like. The steering characteristic information 162 is, for example, characteristic information about a reaction force generated in an operation direction of the steering wheel of the occupant when the vehicle M tends to deviate from the travel lane at the time of execution of LKAS control. The characteristic information includes information about a magnitude of the reaction force. The steering characteristic information 162 stores a plurality of preset steering characteristics. Each of the plurality of steering characteristics may be appropriately adjusted according to the setting of the occupant. The storage 160 may store, for example, driving characteristic information of the occupant, occupant state information, and map information 54 to be described below.

The recognizer 110 recognizes a surrounding situation of the vehicle M on the basis of information input from the external sensor ES. For example, the recognizer 110 recognizes states such as a position, velocity, and acceleration of a physical object located within a prescribed distance from the vehicle M on the basis of the information input from the external sensor ES. The physical object is, for example, a traffic participator such as another vehicle, a bicycle, or a pedestrian. For example, the position of the physical object is recognized as a position on absolute coordinates with a representative point (a center of gravity, a driving shaft center, or the like) of the vehicle M as the origin and is used for control. The position of the physical object may be represented by a representative point such as a center of gravity or a corner of the physical object or may be represented by an area. The "state" of a physical object may include acceleration or jerk of the physical object or an "action state" (for example, whether or not a lane change is being made or intended). The recognizer 110 may recognize types of physical objects (other vehicles, bicycles, and pedestrians), and the like on the basis of characteristic information such as sizes, shapes, and colors of the physical objects.

The recognizer 110 recognizes, for example, a lane in which the vehicle M is traveling (a travel lane). For example, the recognizer 110 recognizes road markings (hereinafter referred to as "markings") on the left and right of the vehicle M from a camera image captured by the camera 10 and recognizes the travel lane on the basis of positions of the recognized markings. The recognizer 110 may recognize the travel lane by recognizing targets (a runway boundary and a road boundary) for identifying lane positions including a shoulder, a curb, a median, a guardrail, a fence, a wall, and the like as well as the markings. In this recognition, the position of the vehicle M acquired from the navigation device 50 and the processing result of the INS may be taken into account. The recognizer 110 may recognize the travel lane with reference to the map information 54 on the basis of the position information of the vehicle M obtained from the vehicle sensor 40 or may recognize the travel lane by comparing a pattern of the road marking obtained from the map information 54 (for example, an arrangement of solid lines and dashed lines) with a pattern of the road marking near the host vehicle M recognized from the image captured by the camera 10. The recognizer 110 may recognize adjacent lanes adjacent to the travel lane of the vehicle M, temporary stop lines, obstacles, red lights, toll booths, and other road events.

When the travel lane is recognized, the recognizer 110 recognizes a position and orientation of the vehicle M for the travel lane. For example, the recognizer 110 may recognize the deviation of the reference point (a center or a center of gravity) of the vehicle M (the distance in a road width direction) from the center of the lane and the angle formed between the traveling direction of the vehicle M and the line connected to the lane center as the relative position and orientation of the vehicle M for the travel lane. Instead of this, the recognizer 110 may recognize the position of the reference point of the vehicle M for any side end of the travel lane (the marking or the road boundary) or the like as a position of the vehicle M relative to the travel lane.

For example, the recognizer 110 implements a function based on artificial intelligence (AI) and a function based on a previously given model in parallel. For example, an "intersection recognition" function may be implemented by executing intersection recognition based on deep learning or the like and recognition based on previously given conditions (signals, road signs, or the like with which pattern matching is possible) in parallel and performing comprehensive evaluation by assigning scores to both recognition processes.

The determiner 120 determines whether or not the vehicle M tends to deviate from the travel lane on the basis of the recognition result of the recognizer 110. For example, the determiner 120 acquires a distance between the center of the vehicle M (which may be the center of gravity) and the center of the travel lane of the vehicle M in a state in which the vehicle M is executing LKAS control and determines that the vehicle M tends to deviate from the travel lane when the acquired distance is greater than or equal to a processing distance. The determiner 120 may determine that the vehicle M tends to deviate from the travel lane when an amount of change (an increased amount) in a distance for a prescribed period of time is greater than or equal to a prescribed amount.

The determiner 120 may determine that the vehicle M tends to deviate from the travel lane when a distance from the marking dividing the travel lane to the center of the vehicle M instead of the distance from the center of the travel lane is less than a prescribed distance or when a decrease amount of the distance for the prescribed period of time is greater than or equal to a prescribed amount. The prescribed distance described above may be a fixed distance or may be set to be variable according to a width of the travel lane, a width of the vehicle, or a road type (for example, an expressway, a general road, or the like).

The acquirer 130 includes, for example, a driving characteristic acquirer 132 and an occupant state acquirer 134. The driving characteristic acquirer 132 acquires the driving characteristics of the driver on the basis of information detected by the vehicle sensor 40 and the driving operation element 80. Driving characteristics include, for example, a driving tendency indicating how the occupant drives the vehicle M. The driving tendency includes, for example, a tendency for a ratio or a frequency at which the center position of the vehicle M deviates from the center of the lane to be high, a tendency that a timing of a steering operation is late (or early), a tendency for a steering amount to be small (or large), and the like when the driving duration is greater than or equal to a prescribed period of time. The driving tendency may include a tendency for the brake timing to be late, a tendency to start suddenly when angry, a tendency to neglect checking the side mirror when talking to a fellow passenger, and the like. The driving characteristics may include, for example, information such as the number of lane deviations and a degree of deviation when LKAS control is not performed and at the time of driving without right turns, left turns, and lane changes.

The driving characteristic acquirer 132 may designate information acquired by the vehicle sensor 40 and the driving operation element 80 as an input during the manual driving of the occupant and acquire driving characteristics of the occupant (driver) using a trained model for outputting the driving characteristics. The trained model may be updated using, for example, a function based on AI such as machine learning (neural network) or deep learning using training (correct) data and the like.

The driving characteristic acquirer 132 may determine a driving level of the occupant on the basis of the driving tendency (for example, a ratio and frequency at which the center of the vehicle M deviates from the center of the lane) at the time of traveling on a straight-line or curved road. For example, the driving characteristic acquirer 132 determines that the driving level of the occupant is higher when the ratio or frequency at which the center of the vehicle M deviates from the center of the lane is lower.

The occupant state acquirer 134 performs an image analysis process for an image captured by the driver monitor camera 70 and detects whether or not the occupant is in a prescribed state on the basis of an analysis result. The prescribed state includes, for example, a state in which the occupant (driver) driving the vehicle M grips the steering wheel, a state in which the occupant monitors the front, and the like. The prescribed state may include a state in which the occupant is talking to another fellow passenger, a state in which the occupant is angry, a state in which the occupant is drowsy, and the like. These states can be acquired from the facial movement and expression of the occupant in the image and the like. The occupant state acquirer 134 may acquire that the occupant is in a state in which manual driving is possible (or a state in which manual driving is not possible).

The occupant state acquirer 134 may derive a driving concentration degree of the occupant (an index value indicating a degree to which the occupant can concentrate on driving) on the basis of an image analysis result. For example, the driving concentration degree when the occupant is talking to a fellow passenger is less than that when the occupant is not talking. When the occupant is yawning and drowsy, the driving concentration degree is made lower than the current degree. When the fellow passenger is a child, the occupant state acquirer 134 may reduce the driving concentration degree as compared with when the fellow passenger is not a child, or the driving concentration degree may decrease as the traveling time increases. The occupant state acquirer 134 may reduce the driving concentration degree when the occupant is looking at the navigation HMI 52 as compared with when the occupant is not looking at the navigation HMI 52 (when peripheral monitoring is not sufficiently performed). Also, in contrast, the occupant state acquirer 134 increases the driving concentration degree, for example, when the occupant (driver) grips the steering wheel and monitors the front for a prescribed period of time or longer, when there is no fellow passenger, or when the occupant (driver) is not talking to a fellow passenger even if there is a fellow passenger.

The occupant state acquirer 134 may acquire the presence or absence of a fellow passenger, the type of fellow passenger (for example, a child or an elderly person), the number of people, a state, and the like as well as a state of the occupant (driver) on the basis of the image analysis result. A part of the above-described information about the driver and the fellow passenger may be acquired using audio information acquired by the driver monitor camera 70 as well as images.

The driving controller 140 automatically controls one or both of steering or acceleration/deceleration of the vehicle M on the basis of a recognition result of the recognizer 110 and a determination result of the determiner 120 to execute driving control. For example, when an operation for executing at least one of various types of driving assistance has been received by the HMI 30, the driving controller 140 controls the driving operation of the vehicle M by the occupant of the vehicle M or the traveling of the vehicle M on the basis of received operation content.

The driving controller 140 includes, for example, a steering controller 142. For example, when the HMI 30 has received an operation indicating that the LKAS control is to be executed (an operation by the occupant), the steering controller 142 executes LKAS control for controlling at least steering of the vehicle M so that the vehicle M travels without deviating from the travel lane. Details of the functions of the steering controller 142 will be described below.

The driving controller 140 may execute control processes of ACC, LCA, an FCW, a CMBS, and the like on the basis of the recognition result of the recognizer 110. For example, the driving controller 140 executes driving control for causing the vehicle M to follow a preceding vehicle and run when an operation of executing ACC control has been received by the HMI 30. When an operation of executing LCA control has been received by the HMI 30, the driving controller 140 sets a target position that does not come into contact with a physical object such as another vehicle in the center of a lane that is a lane change destination located in a direction indicated by a direction indicator switch or the like, notifies the occupant of the set target position from the HMI 30, causes the occupant to execute the steering operation of the vehicle M so that the vehicle M is positioned at the target position, or executes steering control. The driving controller 140 warns the occupant using the HMI 30 when there is a possibility of contact with a physical object in an FCW control process and controls emergency stopping of the vehicle M in a CMBS control process.

The HMI controller 150 notifies the occupant of prescribed information using the HMI 30 and acquires operation content of the occupant received via the HMI 30. For example, the prescribed information includes information related to traveling of the vehicle M such as information about the state of the vehicle M and information about driving control. The information about the state of the vehicle M includes, for example, a speed of the vehicle M, an engine speed, a shift position, and the like. Also, the information about the driving control may include, for example, information indicating which driving control is being executed or information for asking about whether or not to provide driving assistance. The prescribed information may include information that is not related to the traveling control of the vehicle M, such as a television program or content (for example, a movie) stored in a storage medium such as a DVD.

The HMI controller 150 generates an image for allowing the occupant to select or adjust the steering characteristics to be applied during the execution of LKAS control, and causes the display device of the HMI 30 to display the generated image. The HMI controller 150 may cause an image for suggesting a recommended steering characteristic among a plurality of steering characteristics to be displayed on the basis of a road situation (for example, a road type, curvature, a distance from another vehicle, or a congestion situation) of the travel lane of the vehicle M recognized by the recognizer 110 or the like. The HMI controller 150 outputs a selection result and an adjustment result input by the occupant from the HMI 30 to the acquirer 130 and the steering controller 142 or updates the steering characteristic information 162 stored in the storage 160 on the basis of the selection result and the adjustment result.

For example, the HMI controller 150 may generate an image including the above-described prescribed information and cause the display device 32 of the HMI 30 to display the generated image or may generate a sound indicating prescribed information, and cause the generated sound to be output from the speaker of the HMI 30.

The travel driving force output device 200 outputs a travel driving force (torque) for enabling the vehicle to travel to driving wheels. For example, the travel driving force output device 200 includes a combination of an internal combustion engine, an electric motor, a transmission, and the like, and an electronic control unit (ECU) that controls the internal combustion engine, the electric motor, the transmission, and the like. The ECU controls the above-described components in accordance with information input from the driving assistance device 100 or information input from the driving operation element 80.

For example, the brake device 210 includes a brake caliper, a cylinder configured to transfer hydraulic pressure to the brake caliper, an electric motor configured to generate hydraulic pressure in the cylinder, and a brake ECU. The brake ECU controls the electric motor in accordance with the information input from the driving assistance device 100 or the information input from the driving operation element 80 so that brake torque according to a braking operation is output to each wheel. The brake device 210 may include a mechanism configured to transfer the hydraulic pressure generated according to an operation on the brake pedal included in the driving operation elements 80 to the cylinder via a master cylinder as a backup. The brake device 210 is not limited to the above-described configuration and may be an electronically controlled hydraulic brake device configured to control an actuator in accordance with information input from the driving assistance device 100 and transfer the hydraulic pressure of the master cylinder to the cylinder.

For example, the steering device 220 includes a steering ECU and an electric motor. For example, the electric motor changes a direction of steerable wheels by applying a force to a rack and pinion mechanism. The steering ECU drives the electric motor in accordance with the information input from the driving assistance device 100 or the information input from the driving operation element 80 to change the direction of the steerable wheels. The steering device 220 may apply a torque reaction force so that the steering wheel is rotated in a prescribed direction (or so that the steering wheel is not rotated in the prescribed direction) for the occupant's driving operation by controlling the driving assistance device 100.

[Steering Control]

Figure 2:
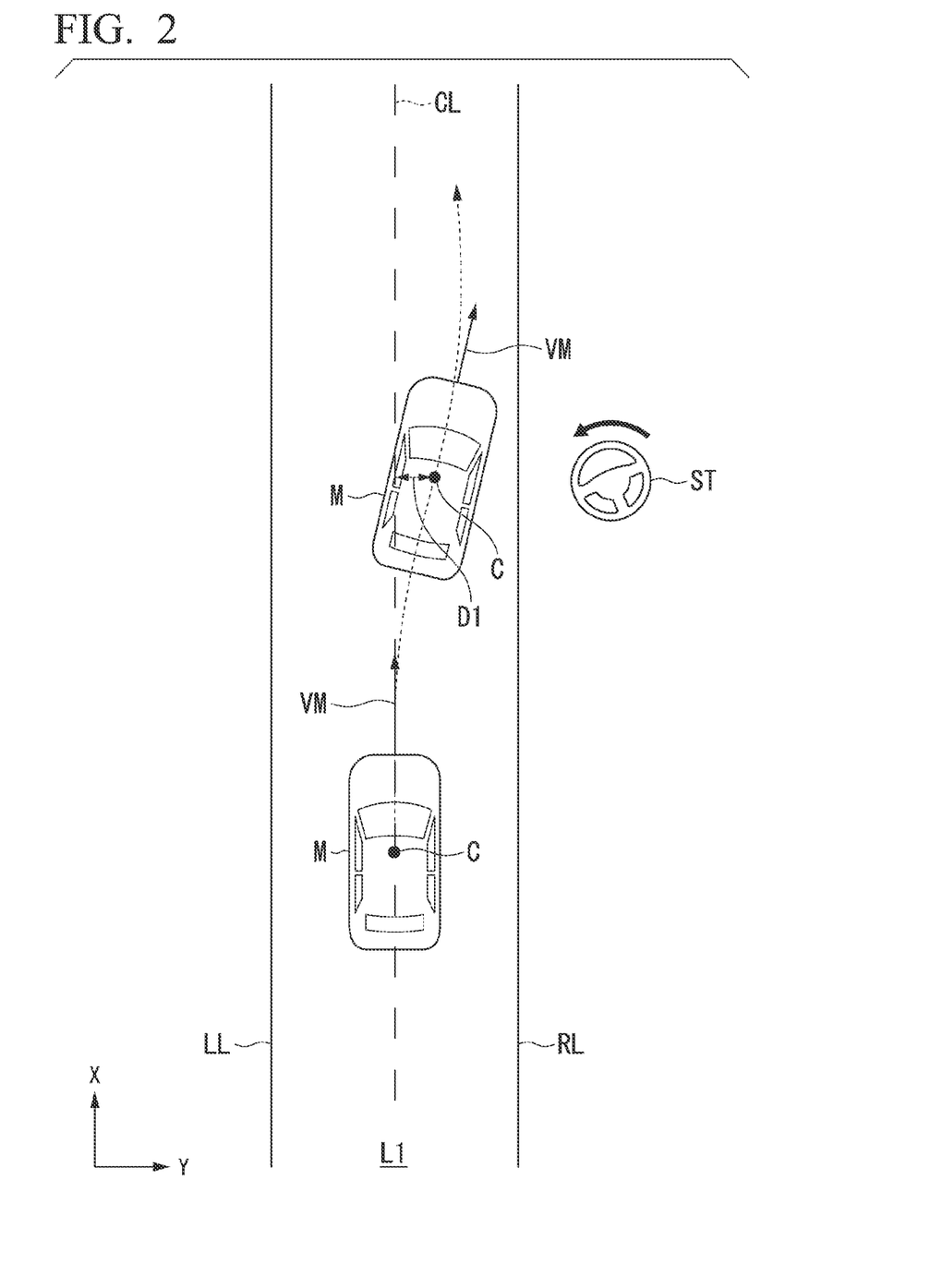
FIG. 2 is a diagram for describing a function of a steering controller.

Next, details of the functions of the steering controller 142 will be described. FIG. 2 is a diagram for describing the function of the steering controller 142. In the example of FIG. 2, the vehicle M traveling at a velocity VM in a lane L1 in which travel in an X-axis direction is possible in FIG. 2 is shown. The lane L1 is divided by markings LL and RL. In FIG. 2, a center CL of the lane L1 is shown.

For example, when the execution of the LKAS control has been received from the occupant, the steering controller 142 controls the steering device 220 and causes the steering wheel ST to output a force (a steering reaction force) opposite to an operation direction of the occupant in accordance with an amount of deviation (a distance D1) in a lateral direction from the center CL (a lane width direction or a Y-axis direction in FIG. 2) so that the center C of the vehicle M passes over the center CL of the lane L1. In other words, the steering controller 142 causes the steering device 220 to output a force for rotating the steering wheel ST toward the lane center CL from the perspective of the center of the vehicle M. Thereby, the vehicle M can be moved to the vicinity of the center CL of the lane L1 and deviation from the lane L1 can be suppressed.

Here, the steering controller 142 selects any one of a plurality of predetermined steering characteristics in accordance with information obtained from the occupant of the vehicle M when a reaction force is applied to the steering wheel ST and controls the steering of the vehicle M so that the vehicle M does not deviate from the travel lane.

Figure 3:
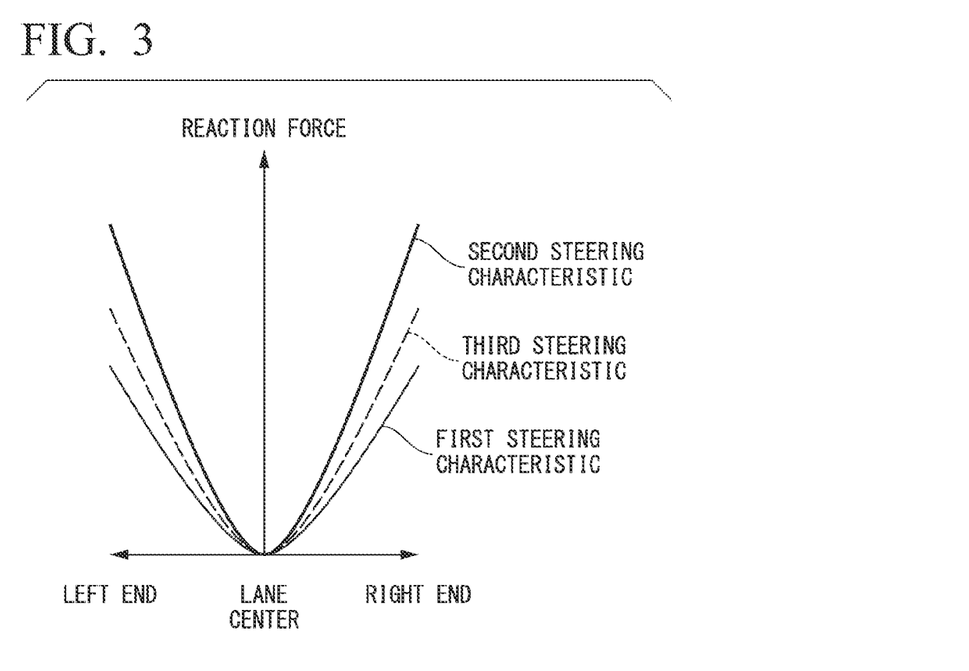
FIG. 3 is a diagram for describing a plurality of steering characteristics according to the embodiment.
Figure 4:
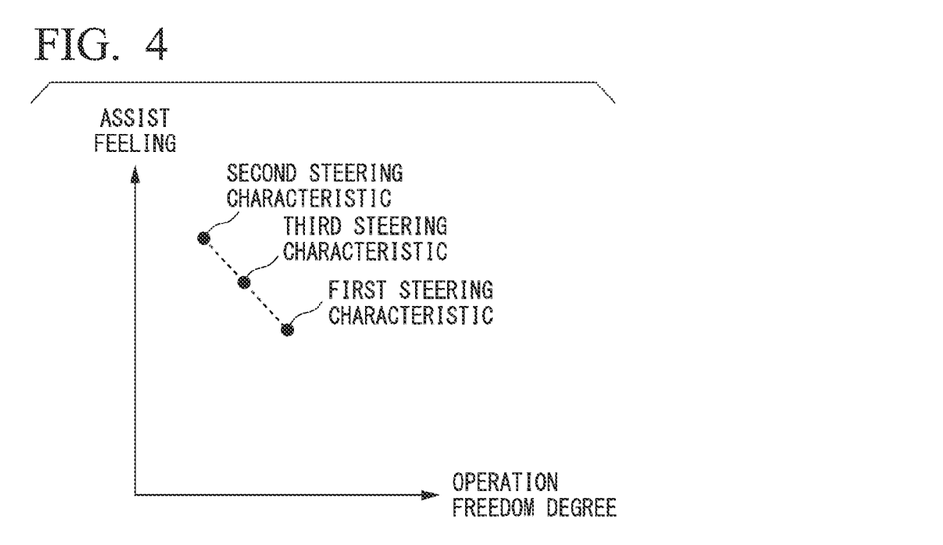
FIG. 4 is a diagram for describing the positioning of the reaction force in each of a plurality of steering characteristics.

FIG. 3 is a diagram for explaining a plurality of steering characteristics according to the embodiment. In the example of FIG. 3, the vertical axis represents a reaction force for the steering wheel, and the horizontal axis represents a distance from the center of the travel lane of the vehicle M. FIG. 4 is a diagram for describing the positioning of the reaction force in each of the plurality of steering characteristics. In the example of FIG. 4, the positioning of steering characteristics using a steering freedom degree and an assist feeling due to the reaction force as index values (biaxial) are shown.

In embodiments, the plurality of steering characteristics included in the steering characteristic information 162 include at least a first steering characteristic and a second steering characteristic. The first steering characteristic is a balanced steering characteristic for emphasizing the balance between the steering freedom degree and the assist feeling as shown in FIG. 4. The second steering characteristic has a greater assist feeling and a lower operation freedom degree than the first steering characteristic. In other words, the second steering characteristic is an aggressive steering characteristic in which the steering reaction force (the assist amount) is larger than the first steering characteristic and the steering control is actively performed on the system side. For example, the second steering characteristic has a larger steering reaction force corresponding to a distance from the center of the travel lane of the vehicle M than the first steering characteristic. In relationships between a position of the vehicle M and positions of the markings on the left and right of the travel lane, a steering reaction force from the marking side to the inside in the second steering characteristic may be larger than that in the first steering characteristic. The type of each steering characteristic is not limited to the above examples.

The plurality of steering characteristics may include a third steering characteristic that is a characteristic between the first steering characteristic and the second steering characteristic. The characteristic between the first steering characteristic and the second steering characteristic is, for example, a characteristic that becomes an intermediate value of the steering characteristics. The steering reaction force degree of each steering characteristic may be appropriately adjusted by the occupant via the HMI 30. When the steering characteristics are adjusted, it is possible to suppress the reaction force from becoming excessively small or large by setting an upper limit value and a lower limit value for adjustment in advance. The plurality of steering characteristics may include steering characteristics other than the first to third steering characteristics. Hereinafter, the steering characteristic information 162 will be described as having first to third steering characteristics.

The steering controller 142 may select, for example, a reference steering characteristic (for example, the first steering characteristic) as an initial setting in advance. The steering controller 142 may select the third steering characteristic having an intermediate value between the first and second steering characteristics as an initial setting and then switch the steering characteristic to either the first steering characteristic or the second steering characteristic in accordance with the selection of the occupant, the driving characteristic, the occupant state, or the like.

For example, the steering controller 142 switches the steering characteristic to the steering characteristics selected by the occupant via the HMI 30 between the first steering characteristic and the second steering characteristic described above to control the steering of the vehicle M. The steering controller 142 may perform a switching process at a timing of LKAS control execution indicated through the HMI 30 after selection or a timing when a prescribed period of time has elapsed from the selection without immediately switching the steering characteristic after the selection by the occupant. Thereby, the reaction force switching can be suppressed in the middle of steering control and safer driving assistance can be performed.

The steering controller 142 may control the steering of the vehicle M by selecting any one of the plurality of steering characteristics on the basis of the driving characteristics of the occupant acquired by the driving characteristic acquirer 132. For example, the steering controller 142 controls the steering of the vehicle by selecting the second steering characteristic when the driving characteristic is a characteristic of the vehicle being likely to deviate from the travel lane and selecting the first steering characteristic as the reference characteristic otherwise. Characteristics of the vehicle being likely to deviate from the travel lane include, for example, driving characteristics of a tendency for a ratio and frequency at which the vehicle M deviates from the center of the lane to be high (above a threshold value), a tendency for the timing of the steering operation to be later (or earlier) than the reference range, and a tendency for the steering amount to be smaller (or larger) than the reference amount.

For example, the steering controller 142 controls the steering of the vehicle M by selecting the second steering characteristic when the driving characteristic indicating that the driving level of the occupant is low (the level is less than the threshold value) is obtained and controls the steering of the vehicle M by selecting the first steering characteristic when the driving characteristic indicating that the driving level of the occupant is high (the level is greater than or equal to the threshold value) is obtained.

The steering controller 142 may select any one of the plurality of steering characteristics on the basis of the occupant state acquired by the occupant state acquirer 134 to control the steering of the vehicle M. For example, the steering controller 142 controls the steering of the vehicle by selecting a second steering characteristic when the occupant state is a state in which the vehicle is likely to deviate from the travel lane and selecting the first steering characteristic as the reference characteristic otherwise. States in which the vehicle is likely to deviate from the travel lane include, for example, a state in which the occupant is talking to another fellow passenger, a state in which the occupant is angry, a state in which the occupant is drowsy, and the like. States in which the vehicle is likely to deviate from the travel lane may include a case where a fellow passenger is a child.

For example, on the basis of the occupant state, the steering controller 142 controls the steering of the vehicle M by selecting the second steering characteristic when the driving concentration degree of the occupant is low (when the driving concentration degree is less than the threshold value) and controls the steering of the vehicle M by selecting the first steering characteristic when the driving concentration degree of the occupant is high (when the driving concentration degree is greater than or equal to the threshold value).

As described above, it is possible to perform reaction force control suitable for a preference or state of the occupant by selecting a steering characteristic in accordance with the information obtained from the occupant of the vehicle M (for example, a steering characteristic selection result of the occupant, the driving characteristic of the occupant, and the occupant state) to control the steering of the vehicle M. Therefore, appropriate lane keeping assistance for the occupant can be provided.

The steering controller 142 may select any one of a plurality of steering characteristics on the basis of a road situation around the vehicle M recognized by the recognizer 110 in addition to information obtained from the occupant of the vehicle M. For example, the steering controller 142 may select the second steering characteristic when the travel lane of the vehicle M is an expressway and select the first steering characteristic because there is a distance from a lane end when the width of the travel lane is wide (when the width of the travel lane is greater than or equal to a prescribed width). For example, the steering controller 142 selects the first steering characteristic when the curvature of the travel lane is less than a threshold value and selects the second steering characteristic when the curvature of the travel lane is greater than or equal to the threshold value. Furthermore, the steering controller 142 may select the steering characteristic in accordance with a velocity of the vehicle M or the like.

The steering controller 142 controls the steering of the vehicle M by switching the steering characteristic to the steering characteristic selected in accordance with a higher-priority condition on the basis of priorities for various types of conditions for selecting the above-described steering characteristics (a condition for information obtained from the occupant of the vehicle M and information of a road situation). The priority may be preset or set to be variable by the occupant. By adjusting the priority according to the occupant's setting, it is possible to select the steering characteristic corresponding to the occupant's preference.

The above-described selection of steering characteristics by the steering controller 142 may be performed during execution as well as before or after execution of LKAS control. Therefore, if the steering characteristic is switched between the first steering characteristic and the second steering characteristic during manual driving by the occupant, because the reaction force control will be different from before, discomfort is likely to be given to the occupant. Therefore, when the steering characteristic is switched between the first steering characteristic and the second steering characteristic, the steering controller 142 may temporarily perform steering control of the vehicle M based on the third steering characteristic. The term "temporarily" may indicate, for example, a prescribed period of time after a process of deciding to switch the steering characteristic to one or the other of the first and second steering characteristics, a period until the vehicle M travels a prescribed distance after the steering characteristic is switched to the third steering characteristic, or a period until a prescribed period of time of steering control based on the third steering characteristic has elapsed. The steering controller 142 may cause the HMI 30 to output which steering characteristic is currently being used for steering control by the HMI controller 150. Thereby, it is possible to suppress discomfort from being given to the occupant when the steering characteristic is switched and execute more appropriate lane keeping control.

The steering controller 142 may select any steering characteristic among the plurality of steering characteristics and control the steering of the vehicle M in accordance with a change in the state of the driving control in operation. For example, the steering controller 142 executes steering control based on the first steering characteristic for a prescribed period of time immediately before or immediately after ALC control in a state in which the steering of the vehicle M is being controlled in the second steering characteristic during the execution of the LKAS control and when the ALC control is started according to an operation by the occupant on the direction indicator switch.

[Processing Flow]

Figure 5:
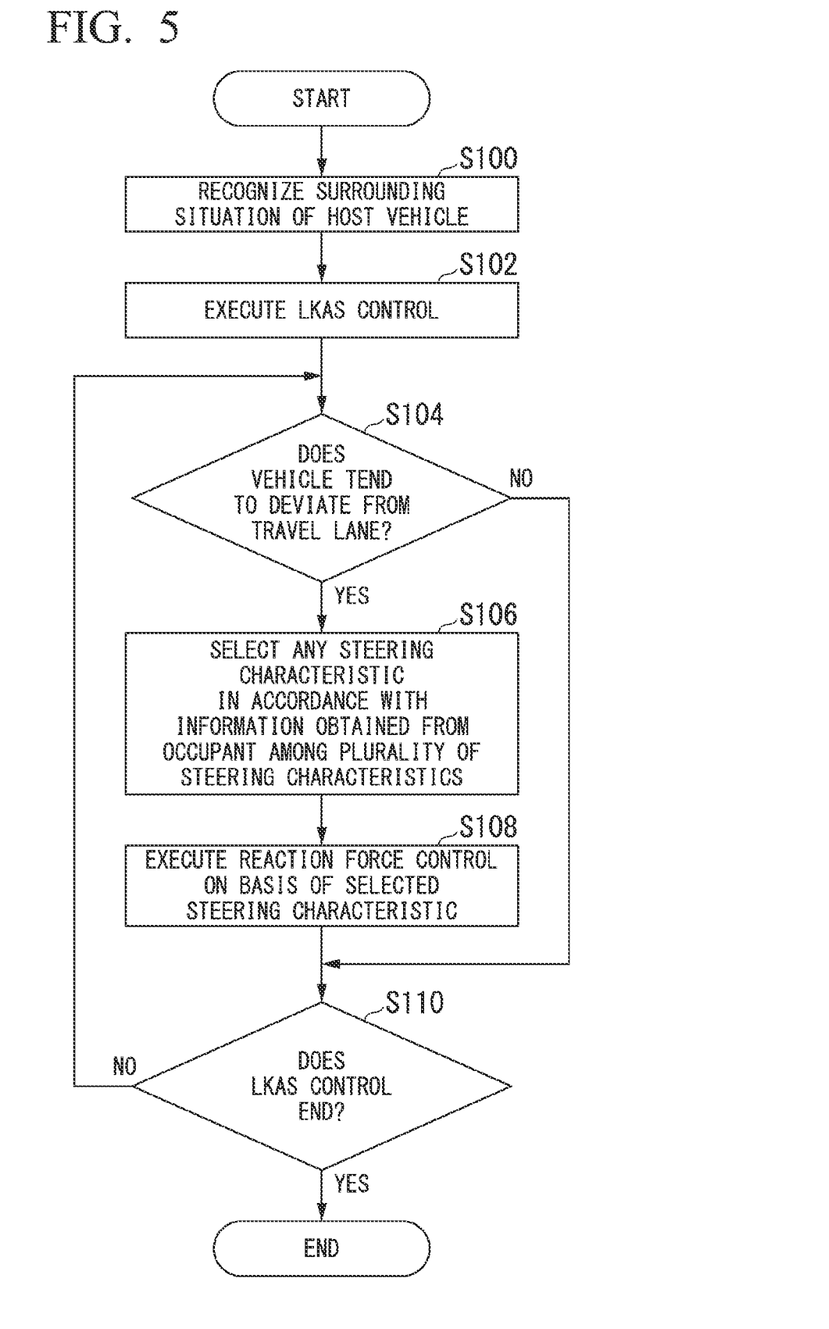
FIG. 5 is a flowchart showing an example of a flow of a process executed by the driving assistance device of the embodiment.

FIG. 5 is a flowchart showing an example of a flow of a process executed by the driving assistance device 100 of the embodiment. In the process of FIG. 5, the lane keeping control process among various types of processes executed by the driving assistance device 100 will be mainly described. The process of FIG. 5 may be performed repeatedly at prescribed cycles or at prescribed timings. At the beginning of the process of FIG. 5, it is assumed that an instruction for causing the vehicle M to execute LKAS control is received by the occupant via the HMI 30.

In the example of FIG. 5, the recognizer 110 recognizes a surrounding situation of the vehicle M (step S100). Subsequently, the driving controller 140 executes LKAS control on the basis of a recognition result of the recognizer 110 (step S102). During the execution of LKAS control, the processing of step S101 is executed all the time.

Subsequently, the determiner 120 determines whether or not the vehicle M tends to deviate from the travel lane on the basis of a position (a deviation amount) of the vehicle M with respect to the center of the travel lane (step S104). When it is determined that the vehicle M tends to deviate from the travel lane, the steering controller 142 selects any steering characteristic in accordance with information obtained from the occupant of the vehicle M among the plurality of steering characteristics (step S106) and executes reaction force control on the basis of the selected steering characteristic (step S108). After the end of step S108 or when it is determined that the vehicle does not tend to deviate from the travel lane in the processing of step S104, the driving controller 140 determines whether or not to end LKAS control (step S110). For example, the driving controller 140 determines to end the LKAS control when an ALC control execution instruction or an LKAS control end instruction, an operation of a direction indicator switch, or the like has been received from the HMI 30 and determines not to end the LKAS control otherwise. When it is determined not to end that LKAS control, the process returns to step S104. When it is determined to end the LKAS control, the process of the present flowchart ends.

According to the embodiment described above, the driving assistance device 100 includes the recognizer 110 configured to recognize a surrounding situation of the vehicle M; and the steering controller 142 configured to control at least steering of the vehicle so that the vehicle M travels in a travel lane when the vehicle M tends to deviate from the travel lane on the basis of a recognition result of the recognizer 110, wherein the steering controller 142 controls the steering of the vehicle M by selecting any steering characteristic in accordance with information obtained from an occupant of the vehicle M among a plurality of steering characteristics, thereby providing appropriate lane keeping assistance for an occupant. Also, it is possible to contribute to the development of a sustainable transportation system.

Specifically, according to the embodiment, it is possible to further improve the marketability of the LKAS system by switching the steering characteristic between a weak steering reaction force characteristic (a first steering characteristic) in which the steering is entrusted to the occupant to some extent and a strong steering reaction force characteristic (a second steering characteristic) for controlling steering on the system side during execution of the LKAS control on the basis of instruction content and driving characteristics of the occupant, a state of the occupant, and the like and by providing an optimal steering reaction force during the LKAS control according to the occupant's preference.

The embodiment described above can be represented as follows.

A vehicle assistance device including:
a storage medium storing computer-readable instructions; and
a processor connected to the storage medium,
the processor executing the computer-readable to:
recognize a surrounding situation of a vehicle;
control at least steering of the vehicle so that the vehicle travels in a travel lane when the vehicle tends to deviate from the travel lane on the basis of a recognition result; and
control the steering of the vehicle by selecting any steering characteristic in accordance with information obtained from an occupant of the vehicle among a plurality of steering characteristics.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:
1. A driving assistance device comprising:
a processor that executes instructions to:
recognize, as a recognition result, a surrounding situation of a vehicle; and
control at least steering of the vehicle so that the vehicle travels in a travel lane when the vehicle tends to deviate from the travel lane on the basis of the recognition result,
wherein the processor controls the steering of the vehicle by selecting any steering characteristic in accordance with information obtained from an occupant of the vehicle among a plurality of steering characteristics,
wherein the processor causes an output device to output information suggesting a recommended steering characteristic among the plurality of steering characteristics based on a road situation near the vehicle, and
after outputting the information suggesting the recommended steering characteristic, the processor controls steering of the vehicle by switching the steering characteristic to a selected steering characteristic selected by the occupant from among the plurality of steering characteristics
wherein the plurality of steering characteristics include at least a first steering characteristic and a second steering characteristic having a larger steering reaction force of the vehicle than the first steering characteristic.

2. The driving assistance device according to claim 1, wherein the second steering characteristic has a larger steering reaction force corresponding to a distance from a center of the travel lane of the vehicle than the first steering characteristic.

3. The driving assistance device according to claim 1, wherein the processor further executes instructions to:
acquire driving characteristics of the vehicle from the occupant of the vehicle, and
control the steering of the vehicle by selecting any steering characteristic among the plurality of steering characteristics on the basis of the driving characteristics.

4. The driving assistance device according to claim 1, wherein the processor further executes instructions to:
acquire an occupant state of the occupant of the vehicle, and
control the steering of the vehicle by selecting any steering characteristic among the plurality of steering characteristics on the basis of the occupant state.

5. The driving assistance device according to claim 1, wherein the processor controls the steering of the vehicle by selecting any steering characteristic among the plurality of steering characteristics on the basis of information obtained from the occupant of the vehicle and a road situation near the vehicle.

6. A driving assistance method comprising:
recognizing, by a computer, a surrounding situation of a vehicle;
controlling, by the computer, at least steering of the vehicle so that the vehicle travels in a travel lane when the vehicle tends to deviate from the travel lane on the basis of the surrounding situation;
controlling, by the computer, the steering of the vehicle by selecting any steering characteristic in accordance with information obtained from an occupant of the vehicle among a plurality of steering characteristics;
causing, by the computer, an output device to output information suggesting a recommended steering characteristic among the plurality of steering characteristics based on a road situation near the vehicle, and
controlling, by the computer, steering of the vehicle by switching the steering characteristic to a selected steering characteristic selected by the occupant from among the plurality of steering characteristics after outputting the information suggesting the recommended steering characteristic
wherein the plurality of steering characteristics include at least a first steering characteristic and a second steering characteristic having a larger steering reaction force of the vehicle than the first steering characteristic.

7. A computer-readable non-transitory storage medium storing a program for causing a computer to:
recognize a surrounding situation of a vehicle;
control at least steering of the vehicle so that the vehicle travels in a travel lane when the vehicle tends to deviate from the travel lane on the basis of the surrounding situation;
control the steering of the vehicle by selecting any steering characteristic in accordance with information obtained from an occupant of the vehicle among a plurality of steering characteristics;
cause an output device to output information suggesting a recommended steering characteristic among the plurality of steering characteristics based on a road situation near the vehicle, and
control steering of the vehicle by switching the steering characteristic to a selected steering characteristic selected by the occupant from among the plurality of steering characteristics after outputting the information suggesting the recommended steering characteristic
wherein the plurality of steering characteristics include at least a first steering characteristic and a second steering characteristic having a larger steering reaction force of the vehicle than the first steering characteristic.

8. The driving assistance device according to claim 1, wherein the plurality of steering characteristics further include a third steering characteristic for controlling the steering of the vehicle according to a steering reaction force between the steering reaction force based on the first steering characteristic and the steering reaction force based on the second steering characteristics, and
wherein the processor temporarily controls the steering of the vehicle according to the third steering characteristic when the steering characteristic is switched between the first steering characteristic and the second steering characteristic.

* * * * *